United States Patent [19]

Harper et al.

[11] 4,361,873

[45] Nov. 30, 1982

[54] CALCULATOR WITH CONSTANT MEMORY

[75] Inventors: Leroy D. Harper, Lubbock; Arthur B. Oliver, Houston, both of Tex.

[73] Assignee: Texas Instruments Incorporated, Dallas, Tex.

[21] Appl. No.: 252,096

[22] Filed: Apr. 8, 1981

Related U.S. Application Data

[63] Continuation of Ser. No. 47,431, Jun. 11, 1979, abandoned.

[51] Int. Cl.³ .............................................. G06F 1/00
[52] U.S. Cl. .................................. 364/707; 364/900
[58] Field of Search ..................... 364/707, 200, 900

[56] References Cited

U.S. PATENT DOCUMENTS

| | | | |
|---|---|---|---|
| 3,641,328 | 2/1972 | Osborne | 364/707 |
| 3,736,569 | 5/1973 | Bovricius et al. | 364/200 |
| 3,855,577 | 12/1974 | Vandiererdonck | 364/200 |
| 3,928,960 | 12/1975 | Reese | 364/707 X |
| 4,157,588 | 6/1979 | Ebihara et al. | 364/707 |

*Primary Examiner*—David H. Malzahn
*Attorney, Agent, or Firm*—Melvin Sharp; Leo N. Heiting; Robert D. Marshall, Jr.

[57] ABSTRACT

A calculator having constant memory utilizing a classical CMOS metal gate process, a low power microcomputer with on-chip and external constant memory capability. Incorporation of a switched negative voltage and a non-switched negative voltage to the appropriate P (—) wells enables the power hungry clocked logic to be turned off while power is maintained on the internal static RAM, on the digit latches, and on the R-lines which connect to both the internal and external RAM. Thus, semi-non-volatile memory (constant memory) capability may be achieved with a low standby current.

5 Claims, 18 Drawing Figures

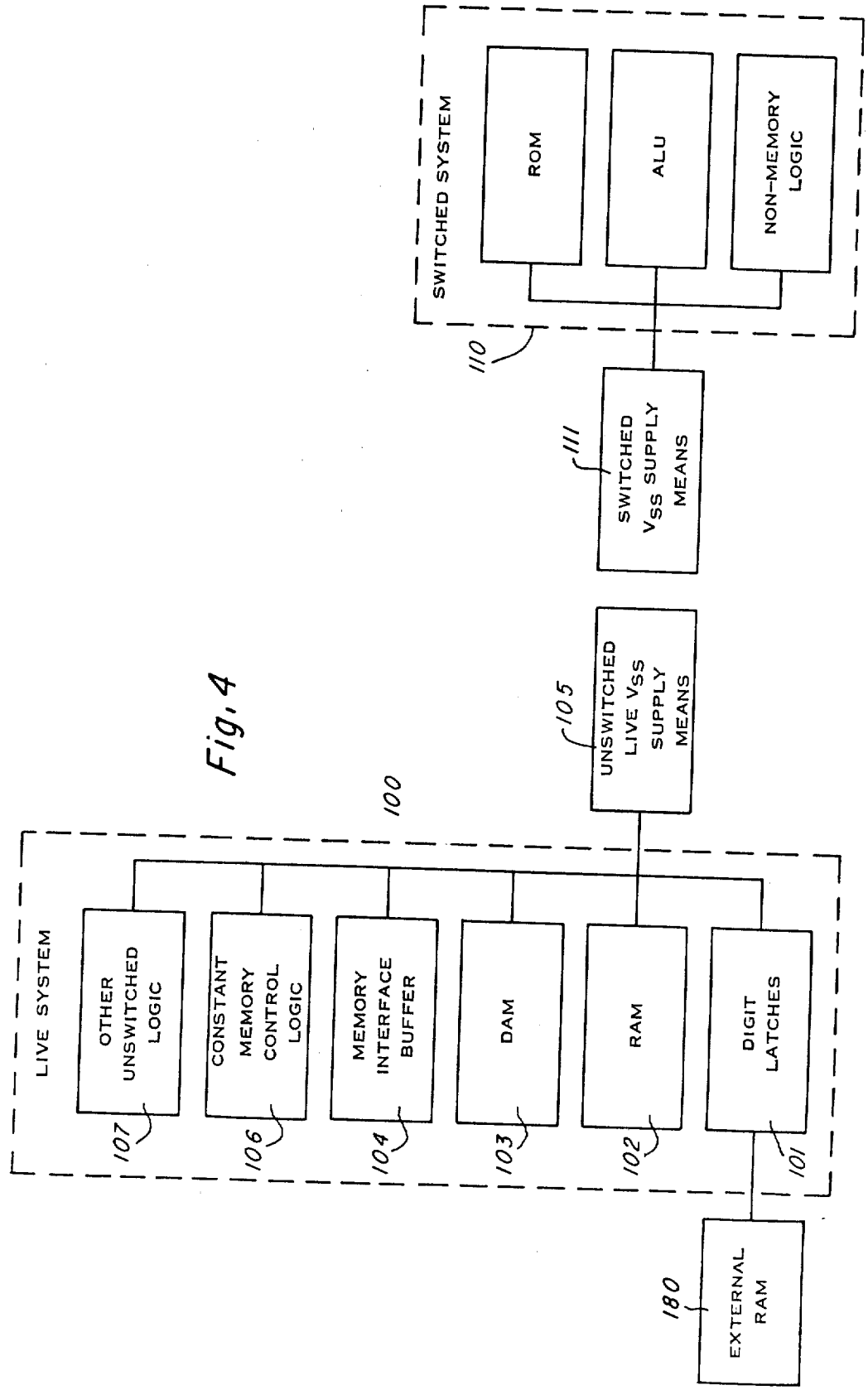

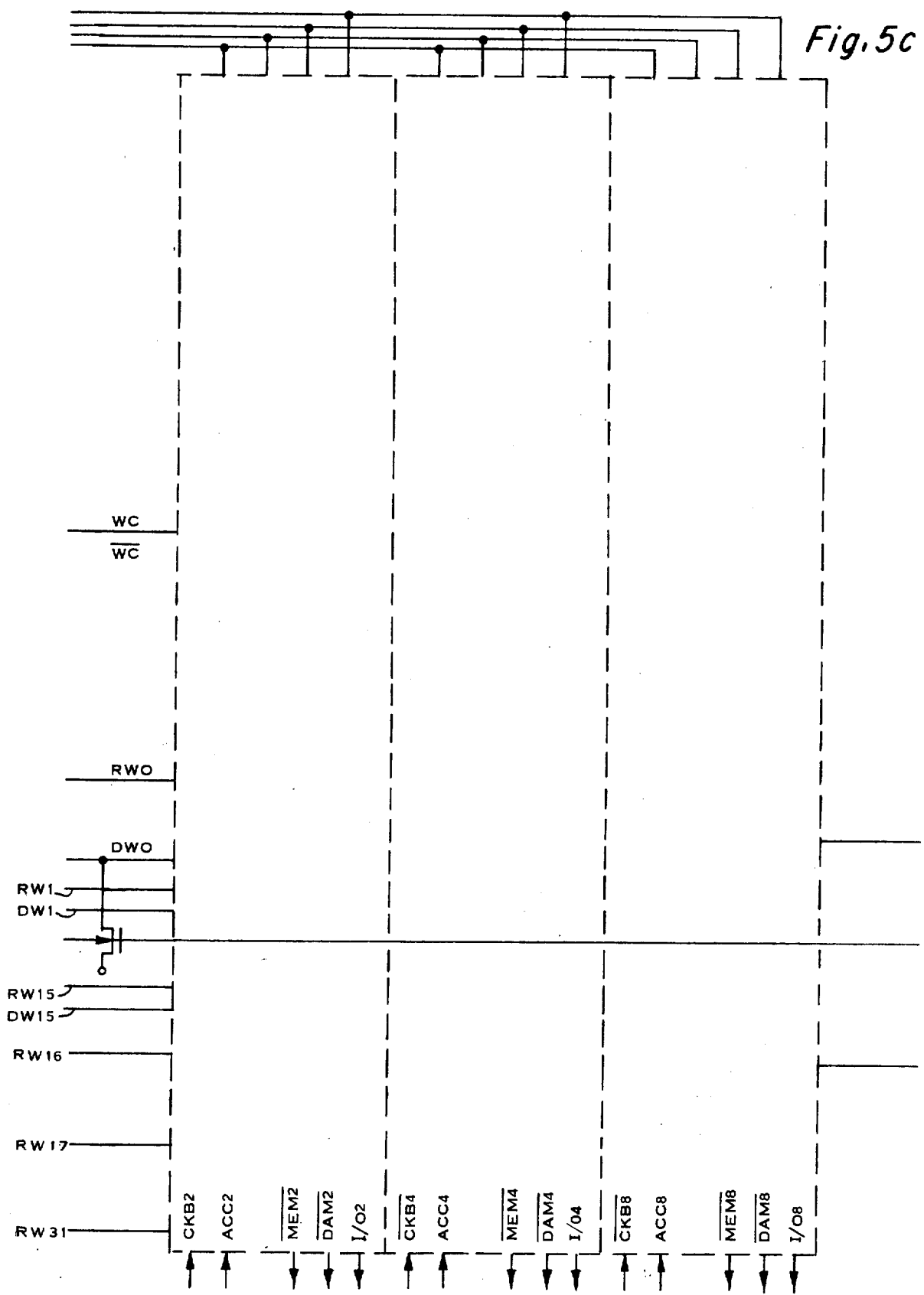

CALCULATOR WITH CONSTANT MEMORY

This is a continuation, of application Ser. No. 47,431, filed June 11, 1979 now abandoned.

SUMMARY OF THE INVENTION

This invention relates to calculators and more particularly to calculators having a constant memory. Constant memory is a twofold advancement over the integrated on switch of the calculators described in U.S. Pat. No. 4,115,705, which is assigned to the assignee of the present invention. In such calculators, live power is provided only to the logic necessary to detect a predetermined voltage level on a selected input line, that would then turn on a large device that would switch power to the remainder of the chip.

The integrated circuit chip provided in the calculator of the present invention is an improvement over the calculator integrated circuit chip of U.S. Pat. No. 4,115,705 utilizing a C-MOS metal gate process to produce a low power chip capable of operation in a LCD calculator, for example, the Texas Instruments Incorporated TI 50, for at least 1000 hours. Additionally, the chip has the capability of communicating with an external standard off the shelf CMOS RAM chip so as to implement an LCD INSTANT REPLAY calculator. Because of the low stand-by power required to keep the external CMOS RAM on live power, it would be acceptable to leave it on live power and not switch its power through the integrated on-switch. On-chip static CMOS RAM and associated circuitry is also connected to live power to achieve a semi-non-volatile on-chip constant memory.

To maintain live power on the external RAM chip and the on-chip static RAM of one embodiment, live power is run to the digit latches and R-line drivers (I/O lines), Chip Select, and Read/Write lines which control the external and internal RAM, and thereby provide an on-chip and an external semi-non-volatile constant memory. (Data maintained for the length of the battery life).

Because of the proximity of the digit latches and internal RAM in such embodiment, live power to the on chip semi-non-volatile static memory is preferably implemented by a common attachment to live power with the digit latches.

In effect, by running a switched negative voltage (SVSS) and a non-switched (or live) negative voltage (LVSS) to the appropriate P (—) wells, the power consumptive clocked logic, for example, ROM Page Register, ROM, ALU, oscilator, clock, etc.) may be turned off while power is maintained on the internal static RAM, RAM Write Logic, Digit latches, and R-Lines, and both an internal and external semi-non-volatile CMOS memory (CONSTANT MEMORY) may be achieved without exceeding a specified OFF (or standby) current of 2 microamps in a preferred embodiment.

BRIEF DESCRIPTION OF THE DRAWINGS

The novel features believed characteristic of the invention are set forth in the appended claims. The invention itself, however, as well as other features and advantages thereof, will be best understood by reference to the following detailed description of illustrative embodiments, when read in conjunction with the accompanying drawings, wherein:

FIG. 4 is an electrical block diagram of a constant memory design utilizing the invention;

FIGS. 5a-5d together form a detailed schematic diagram corresponding to and detailing the live system 100 of FIG. 4;

FIGS. 11a-11b and 12a-12d are detailed schematic diagrams of one embodiment of the present invention working in conjunction with the circuits comprising the other unswitched logic 107 of FIG. 4, as described in copending application Ser. No. 46,887, now U.S. Pat. No. 4,264,963, by Leach et al, for "Static Latches for Storing Display Segment Information" filed June 8, 1979, copending application Ser. No. 46,888, filed June 8, 1979, by Tubbs et al, for "Rationless Logic for CMOS" and copending application Ser. No. 106,430, filed Dec. 26, 1979, by Tubbs, for "Turn Off Processor Between Key Strokes", all assigned to the assignee of the present application.

DETAILED DESCRIPTION OF THE INVENTION

Figure 1:
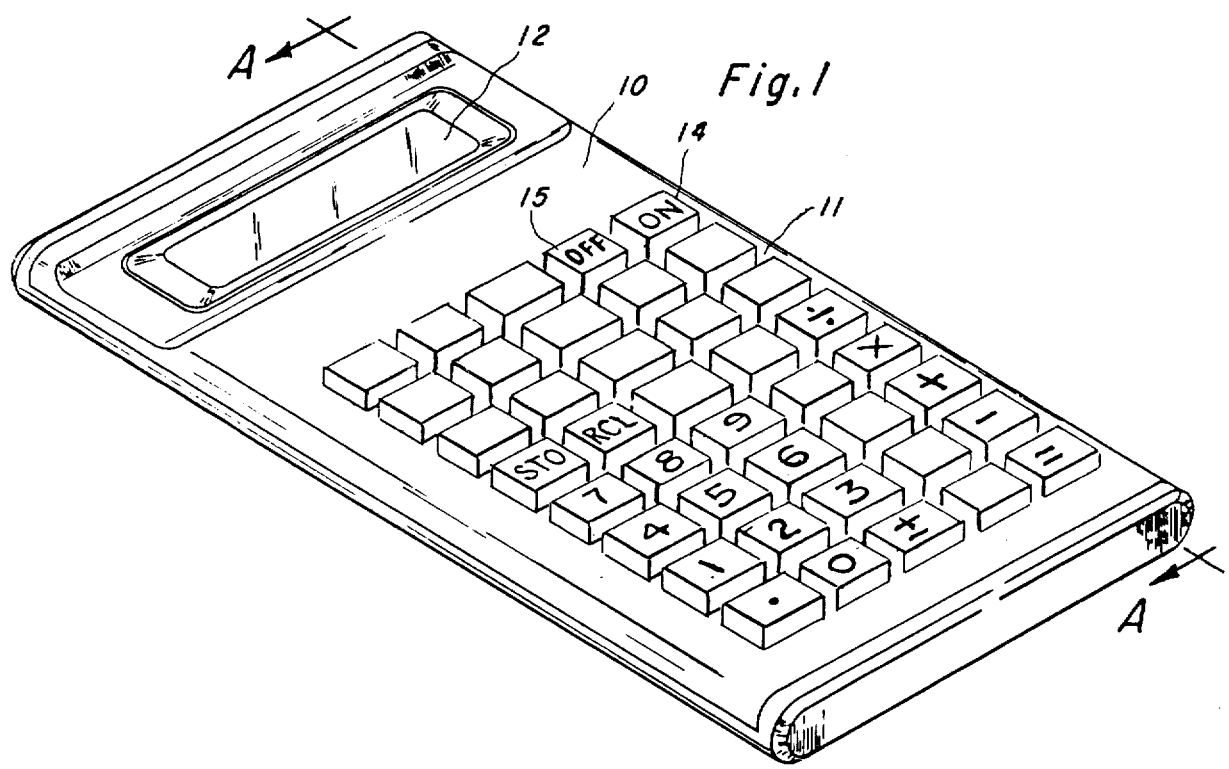
FIG. 1 is a pictorial view of a handheld calculator in which constant memory designs embodying the invention may be utilized advantageously.

Referring to FIG. 1, a typical handheld electronic calculator which incorporates the invention is shown. The calculator comprises a case or housing 10 of molded plastic or the like, with a keyboard 11 and a display 12. The keyboard includes number keys 0-9, a decimal point key, and several standard operation keys such as $+$, $-$, $=$, $\times$, $\div$, etc. In some embodiments, the calculator system could perform a variety of additional functions, so keys such as $\sqrt{x}$, $\sqrt{y}$, $Y^x$, SIN, COS, TAN, LOG, %, LN, STO, RCL, etc., may be included in the keyboard 11. The display 12 has a number of digits of seven segment type, with decimal points. Displays of eight, 10 or 12 digits are standard and these may also include exponents for scientific notation, and minus sign for both mantissa and exponent. The display usually comprises liquid crystal devices (LCD), although visible light emitting diodes, vacuum fluorescent displays, or a gas discharge panel, for example, may also be used with appropriate interface circuitry. The calculator is a self-contained unit having a power supply in the form of a battery or batteries within the housing 10, although an AC adapter may be attached, as well as a battery charger if rechargeable nickel cadmium batteries are used.

In place of the usual ON-OFF slide switch which has been used in prior calculators, the calculator of FIG. 1 includes a push-button, momentary contact on switch 14 and a like push-button OFF switch 15. The switches 14 and 15 are exactly like the remainder of the keyswitches in the keyboard 11 in that they are single-pole single-throw normally open "Form A" switches which remain closed only as long as pressure is manually applied. In contrast, the usual slide switch would remain closed when moved to the ON position, supplying voltage from the battery to the electronic circuitry of the calculator continuously until the switch is manually moved to the OFF position.

Figure 2:
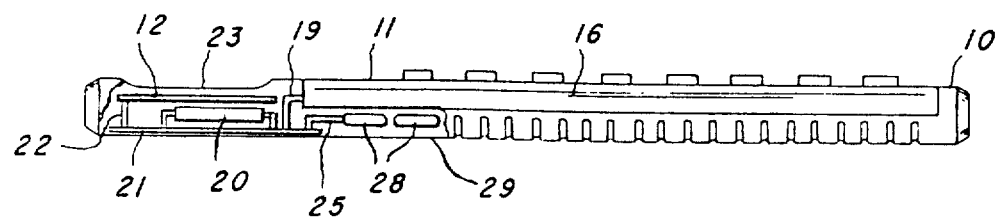
FIG. 2 is an elevational view in section of the calculator of FIG. 1 taken along the line A—A of FIG. 1.

In FIG. 2, the general form of the internal structure of the calculator is seen. The keyboard 11 includes an X-Y matrix keyboard device 16 of the type shown in U.S. Pat. No. 4,005,293 issued Jan. 25, 1977, assigned to Texas Instruments Incorporated. About ten to thirteen rigid wires 19 extend from the end of the keyboard device 16 for connection to the electronic circuitry of the calculator. A calculator chip 20 contains all of the memory, arithmetic and control circuitry, as will be described. The chip 20 is encased in a standard twenty-eight pin dual-in-line plastic package for example, which is commonly used in the semiconductor industry. Depending upon the complexity of the calculator, and the multiplexing scheme used, the number of pins in the package could be more or less, and also other chip packaging and mounting techniques may be used. The chip 20 is connected to a printed or etched circuit board 21 by soldering the pins to conductors on the board, as are the wires 19. The display 12 is mounted on a small PC board 22, beneath a plastic lens 23 which enhances the visibility of the display. The PC board 22 is mounted on the board 21 by pins soldered to conductors on the board which make the desired connections from the chip 20 to the display. A pair of silver oxide or equivalent batteries 28 are mounted in a compartment behind a door 29 in the housing 10, and is connected to the PC board 21 by wires 25 which are soldered to the PC board at one end and engage terminals of the battery by connectors at the other end.

The simplicity of the calculator is apparent from FIG. 2. It consists of a housing, a keyboard device, a chip, a display device, two small PC boards, and a battery. No components are needed on the board 21 except the chip 20, i.e., no resistors, capacitors, transistors, drivers, or any other devices. Thus, the relative cost savings of eliminating a power switch can be appreciated. The savings will be not only in materials but in assembly time, as well as reliability.

Figure 3:
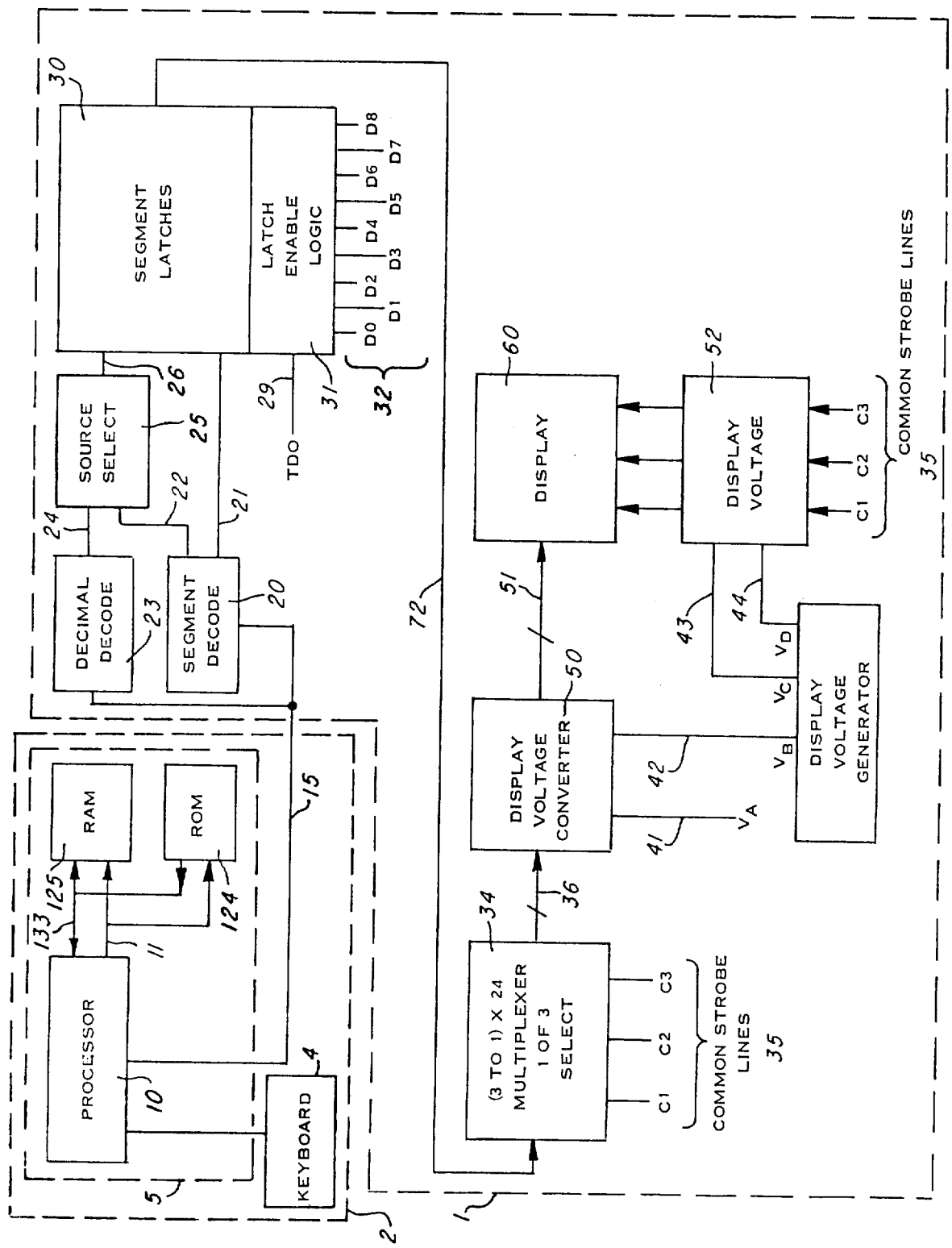
FIG. 3 is an electrical block diagram of one type of MOS/LSI calculator chip which may use the principle of the invention, in particular the chip 20 of FIG. 1.

A block diagram of the system within the chip 20 of FIG. 2 is shown in FIG. 3. This system is a digit processor chip, such as that described in U.S. Pat. Nos. 3,991,305 or 4,014,013. The system is shown as being comprised of two sub-systems, the display interface 1 and the processor and user input interface 2. The sub-system 2 is comprised of a keyboard 4 for providing a means of user data input. The keyboard 4 is connected to the processor/memory sub-system 5. The processor/memory sub-system 5 scans and decodes the user input from the keyboard 4, either continuously, or upon detection of a key depression as described in co-pending application Ser. No. 106,430, filed Dec. 26, 1979, by Tubbs for "Turn Off Processor Between Key Strokes". The processor/memory sub-system 5 is centered around a ROM (read-only-memory) 124 and a RAM (random-access-memory) 125. The ROM 124 contains a large number, for example, 1024 or 2048, instruction words of 8 or 9 bits per word and is used to store the program which operates the system. The RAM 125 contains 256 up to 1024 (or greater) memory cells organized as 4 to 16 (or greater) digit groups with 4 bits per digit. The number of words in the ROM 124 or cells in the RAM 125 depends on desired complexity of the calculator functions. Numerical data entered by the keyboard 4 is stored in the RAM 125, along with intermediate and final results of calculations, as well as status information or flags, decimal point position, and other working data. The RAM 125 functions as the working registers of the calculator system, although it is not organized in a hardware sense as separate registers as would be true if shift registers or the like were used for this purpose. Additionally, the output of the RAM 125 is selectively connected via line 15 to the display interface 1.

The ROM 124 produces an 8 bit or 9 bit instruction word on ROM output line 133 during each instruction cycle. The instruction is selected from 8192 bit locations in the ROM, organized into 1024 words containing 8 bits each, for a minimum function calculator, or from 18432 bit locations organized into 2048 9 bit instruction words for a complex function calculator. Other organizations may also be used as needed. The operation of the processor/memory sub-system 5 as relates to ROM, RAM, and numerical function circuitry may be better understood by reference to U.S. Pat. 4,115,705.

The RAM 125 is utilized by the processor/memory sub-system 5 to store display data. The processor/memory sub-system 5 provides both the digit data, as encoded, for example, in binary coded decimal format and output on line 15, but additionally supplies digit strobe synchronization signals on connector 32, connecting to display interface 1, for coordinating digit segment decode storage in the segment latches 30 via latch enable logic 31 of the display interface 1. Furthermore, in a preferred embodiment, the processor/memory sub-system 5 provides decimal position information on connector 15 to the display interface 1, as disclosed in co-pending application Ser. No. 46,887, filed June 8, 1979, now U.S. Pat. No. 4,264,463, by Lech et al, for "Static Latches for Storing Display Segment Information."

By leaving live power to the static latch memories and the associated stand-by support circuitry, the memory contents are maintained in a valid state. It is therefore possible to preserve RAM memory contents even when the remainder of the calculator circuitry is in an off state. With CMOS static latch memories this results in extremely low levels of power consumption in the calculator off state. Modifications must be made to a non-constant memory calculator design to achieve a constant memory calculator. Circuitry that addressed the RAM must be modified to interact properly with a power-up-clear signal. Additionally, all read-write logic and address lines associated with the RAM must be inhibited upon activation of the power-up-clear signal. When the system is powering up, the program counter is cleared to location O, and the address and control lines associated with the RAM are inhibited, forced to a default state, to prevent false address and control signals from being generated. False address and control signals could result in random data being written into the RAM, effectively writing over the prior contents of the RAM cells, thereby effectively forcing the loss of stored data. In the constant memory system, false address and control signals must be prevented both during the calculator off state, power-up state, and on state. In a preferred embodiment, as described with reference to FIGS. 9-10, the power-up-clear signal may be a bi-level control signal having an on level and an off level. Upon transition to the calculator on-state from the calculator off-state, the power-up-clear signal must remain at the off level for a predefined time delay interval to prevent constant memory generation of false signals. The power-up-clear signal is then switched to the on-level, and remains at the on-level until the calculator is deactivated to the off-state, causing the power-up-clear signal to return to the off-level. A further modification from the non-constant memory calculator design to achieve the constant memory calculator design requires that live power be maintained to the RAM and associated constant memory control and address signal buffers during both the on-state and off-state of the calculator, while live power is disconnected from the remainder of the calculator circuitry. Thus, extremely low power off-state calculator operation may be achieved while maintaining constant valid data in the RAM in both the on-state and off-state of the calculator.

Referring to FIG. 4, an embodiment of the present invention in a partitioned system architecture is shown in block diagram form. The constant memory feature is derived from a continuous power live system 100 connected to the unswitched live main supply means 105. Power is connected to the live system 100 continuously during both the on state and off state of the calculator. Additionally, the architecture is partitioned such that a switched system 110 is connected to a switched main supply means 111. During the calculator on-state, main supply power is connected to the switched system 110 by the switched supply means 111. However, during the calculator off-state, the switched system 110 is isolated from the main supply by the switched supply means 111. The switched system 110 is comprised of power consumptive logic, such as a ROM page register, ALU, oscilator, clock, and other non-memory logic. By removing power from the switched system 110 in the calculator off-state, power consumption during the off-state is limited to that due to the live system 100. The live system 100 is comprised of digit latches 101, RAM (random-access-memory) 102, DAM (direct access memory) 103, memory interface buffer 104, constant memory control logic 106, and other unswitched logic 107. In the preferred embodiment, the unswitched logic 107 is comprised of an integrated on/off system, such as that disclosed in U.S. Pat. No. 4,115,705, as well as other non-constant memory unswitched circuitry.

Referring to FIGS. 5a-d, the digit latches 101, RAM 102, DAM 103, and memory interface buffer 104 of FIG. 4 are shown in detailed schematic form. The digit latches 101, the RAM 102, and the DAM 103, share common word select decode signal lines. The memory interface buffer 104 serves as a common buffer and driver for the the word lines to RAM 102, DAM 103, and digit latches 101. The buffer 104 is comprised of multiple buffer-driver circuits 108. Each buffer circuit 108 has an isolation transistor 109 for selectively connecting the buffered word select inputs 1-9 to the common word line busses for the RAM 102, DAM 103 and digit latches 101, in response to a decode enable signal 112. The isolation transistor 109 is connected to a word select decode enable means 115 which is part of the constant memory control logic 106. The decode enable means 115 is responsive to clock and control signals from the switched system 110 during the calculator on-state, outputting the signal 112 to control the isolation transistor 109. However, in the calculator off-state, the decode enable means 115 causes the decode enable signal 112 to go to an inactive state, thereby inhibiting the isolation transistor 109, thereby preventing spurious data from being output to the common word lines of the RAM 102, DAM 103 and digit latches 101.

The RAM 102 has page decode lines 120 forming a decode matrix with the common word lines from memory buffer 104. The page decode lines 120 are output from the RAM page decode 121 which forms a position of the constant memory control logic 106 of FIG. 4. RAM page buffer 122, and write logic buffer 123, both forming a part of the memory interface buffer 104 of FIG. 4, are switched to a memory protect signal level during the calculator off-state. In a preferred embodiment, the RAM 102 and DAM 103 are comprised of individual RAM cells 130, and the digit latch is comprised of individual memory cells 131, similar to the RAM cells 130 of the RAM 102 and DAM 103, but having an extra inverter driver output state. Thus, by connecting the circuitry of FIG. 5 to live power, constant memory operation is achieved.

As shown in part by FIGS. 5a-d, modifications must be made to a non-constant memory calculator design to achieve a constant memory circuit. Any circuitry that addresses the RAM and interacts with a power-up-clear signal must be modified. All read-write logic and address lines associated with the RAM must be inhibited upon activation of the power-up-clear signal. When the calculator system is powered up from the off-state to the on-state, a program counter is cleared to location O, and the address lines and control lines signals associated with the RAM are inhibited to prevent false writing of data into the RAM. The inhibiting of address and control signals is effectuated by the memory buffer interface 104 and the constant memory control logic 106. Thus, in addition to maintaining live power to the constant memory circuit elements, a means must be provided for preserving isolation state of the memory interface buffer 104 for a stabilizing time interval related to the power-up of the calculator to the on-state. In a preferred embodiment, the constant memory control logic 106 of FIG. 4 provides a power-up-clear control signal, explained in greater detail in FIGS. 9 and 10, which connects to the isolation control circuitry associated with the digit latches 101, and the RAM 102, DAM 103, as shown in FIGS. 5a-d.

Figure 5A:
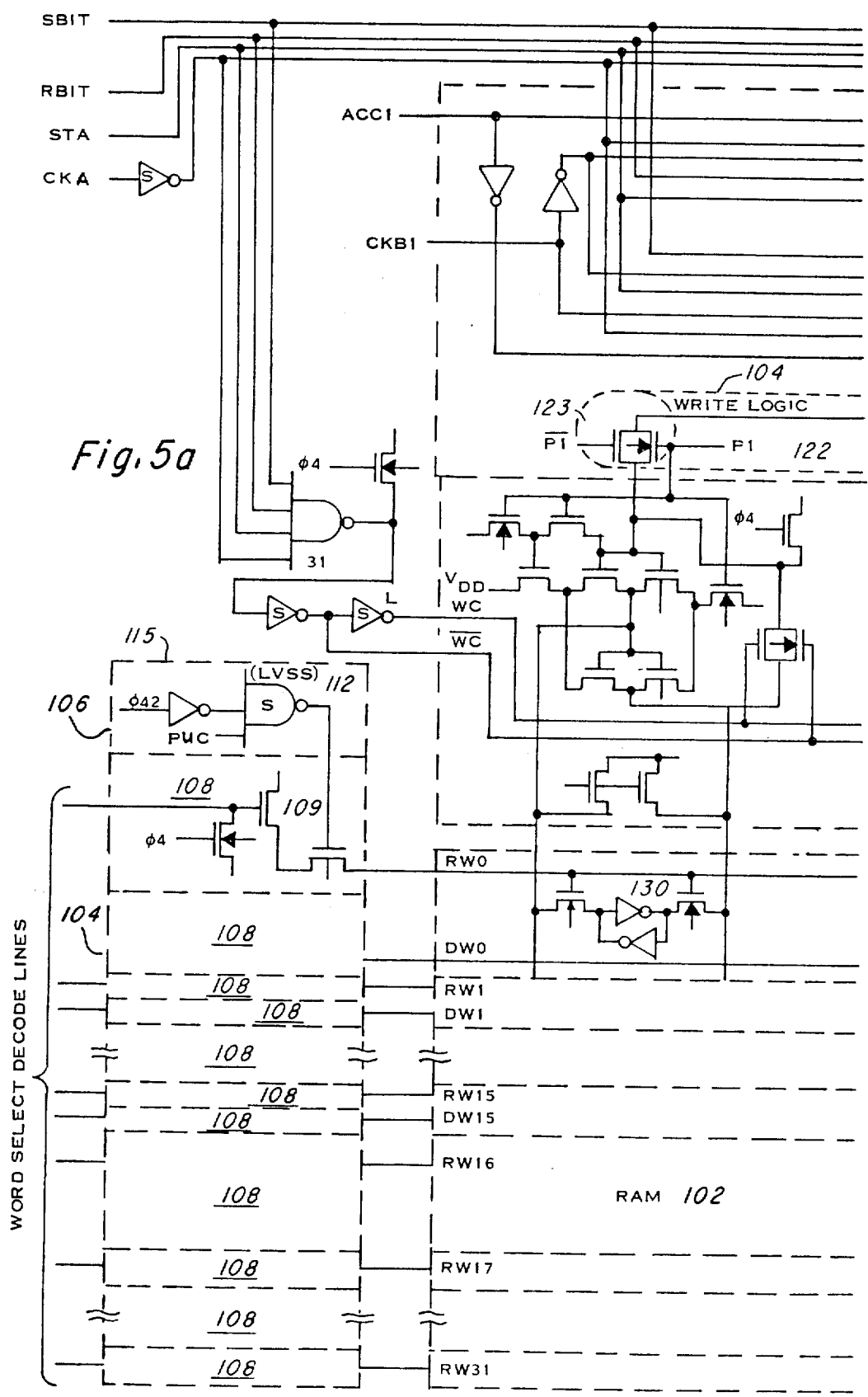
Figure 5B:
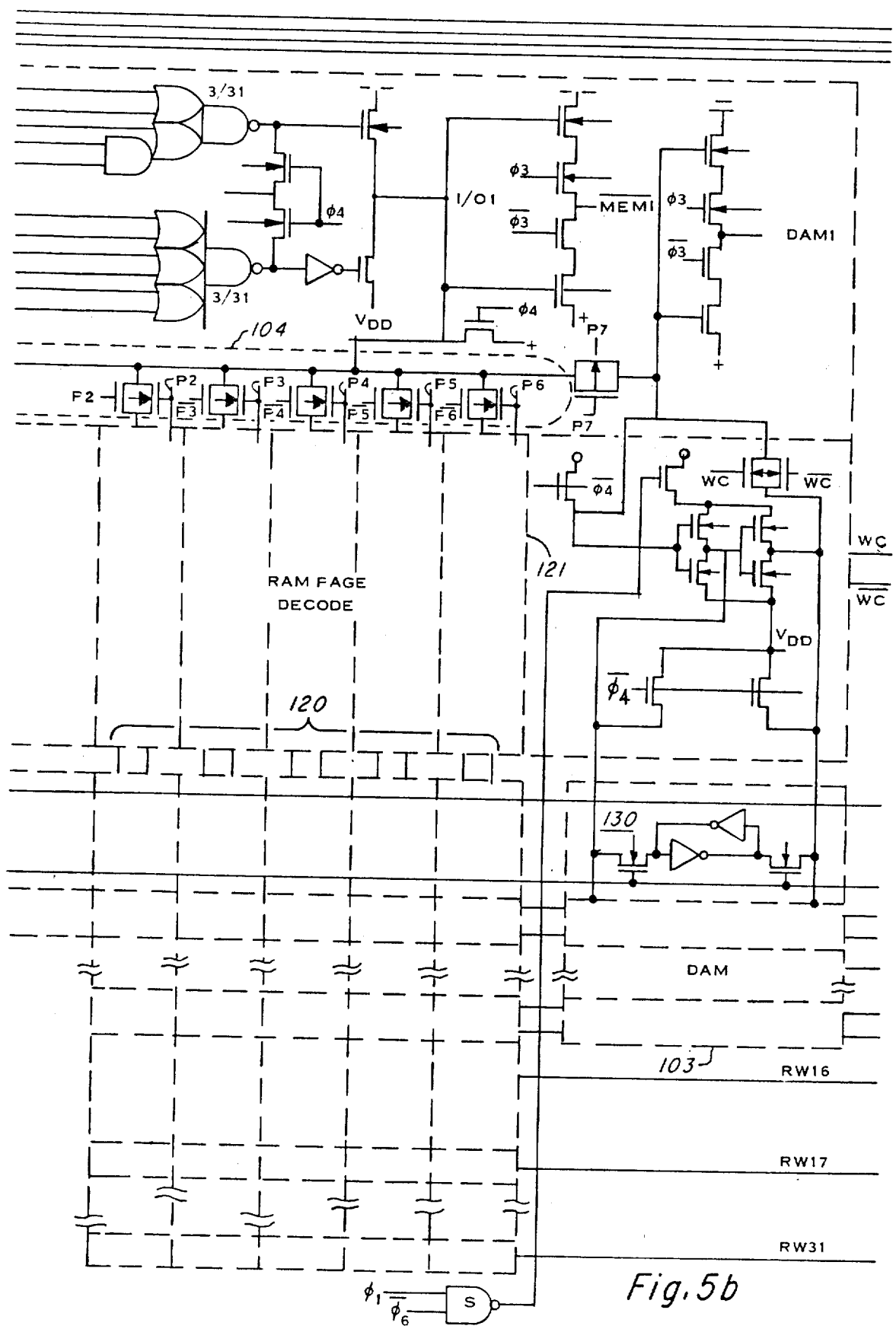
Figure 5D:
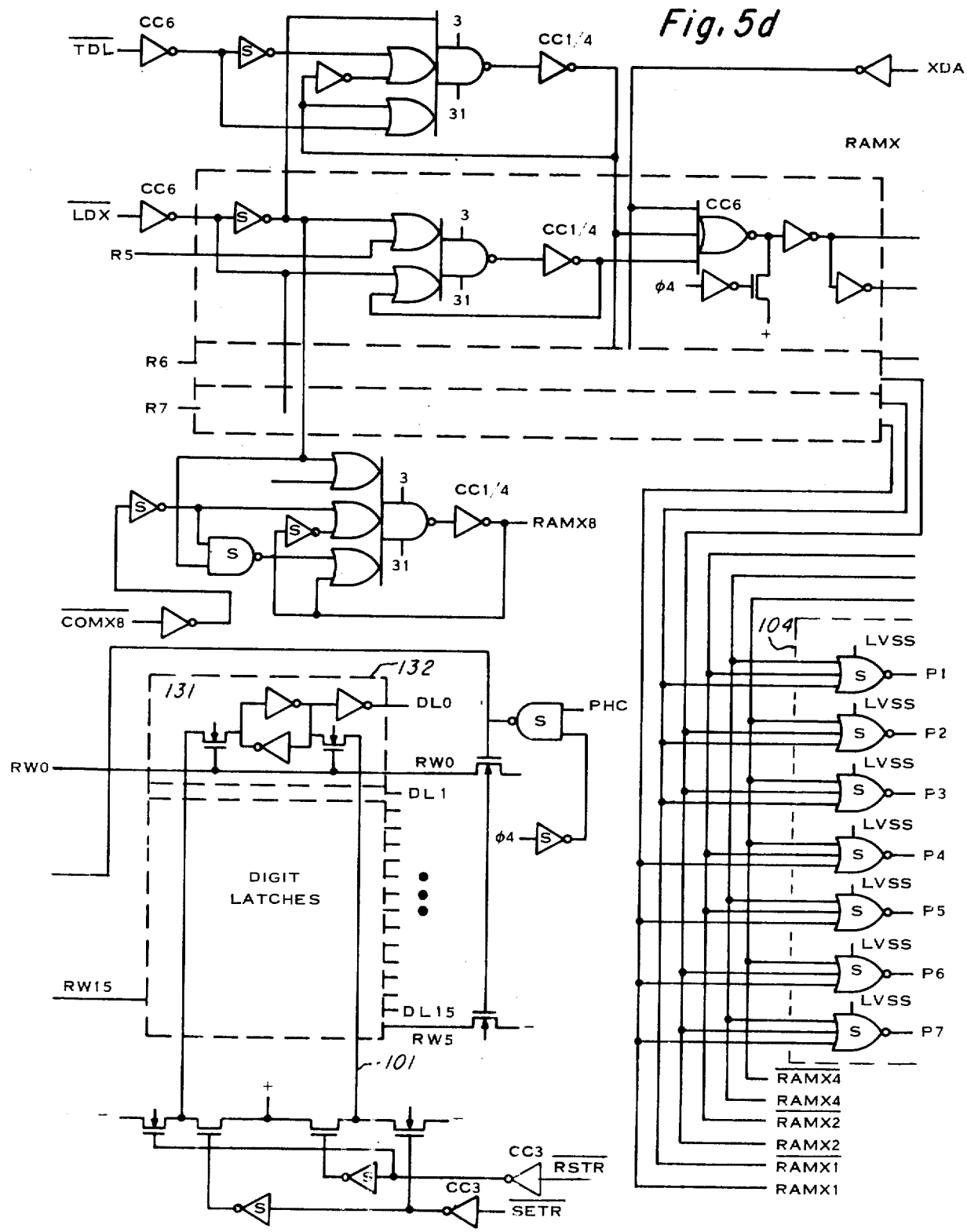
Figure 6:
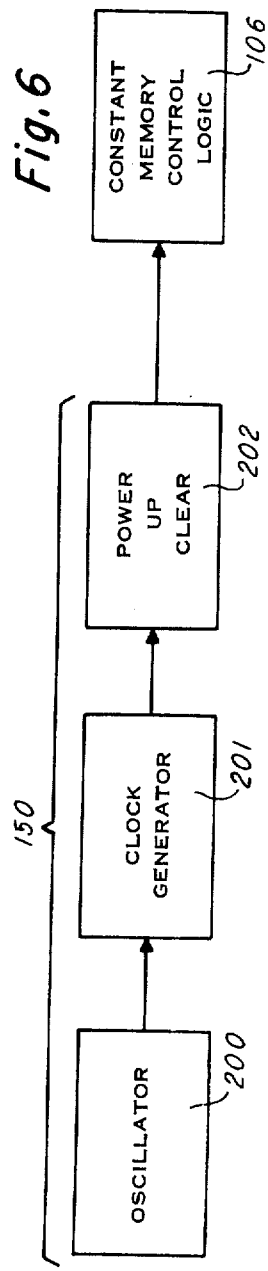
FIG. 6 is an electrical block diagram partially detailing the clock and power up clear circuitry of unswitched logic 107 of FIG. 4, and the interreaction of this circuitry with the constant memory control logic 106 of FIG. 4.

Referring to FIG. 6, an oscillator 200 is connected to a clock generator 201, the generator 201 is connected to a power-up-clear circuit means 202. The power-up-clear means 202 provides a power-up-clear signal having a power-up stabilizing time interval delay prior to the power-up-clear signal going to the active state, which is connected to the constant memory control logic 106 of FIGS. 4 and 5a-d.

Figure 7:
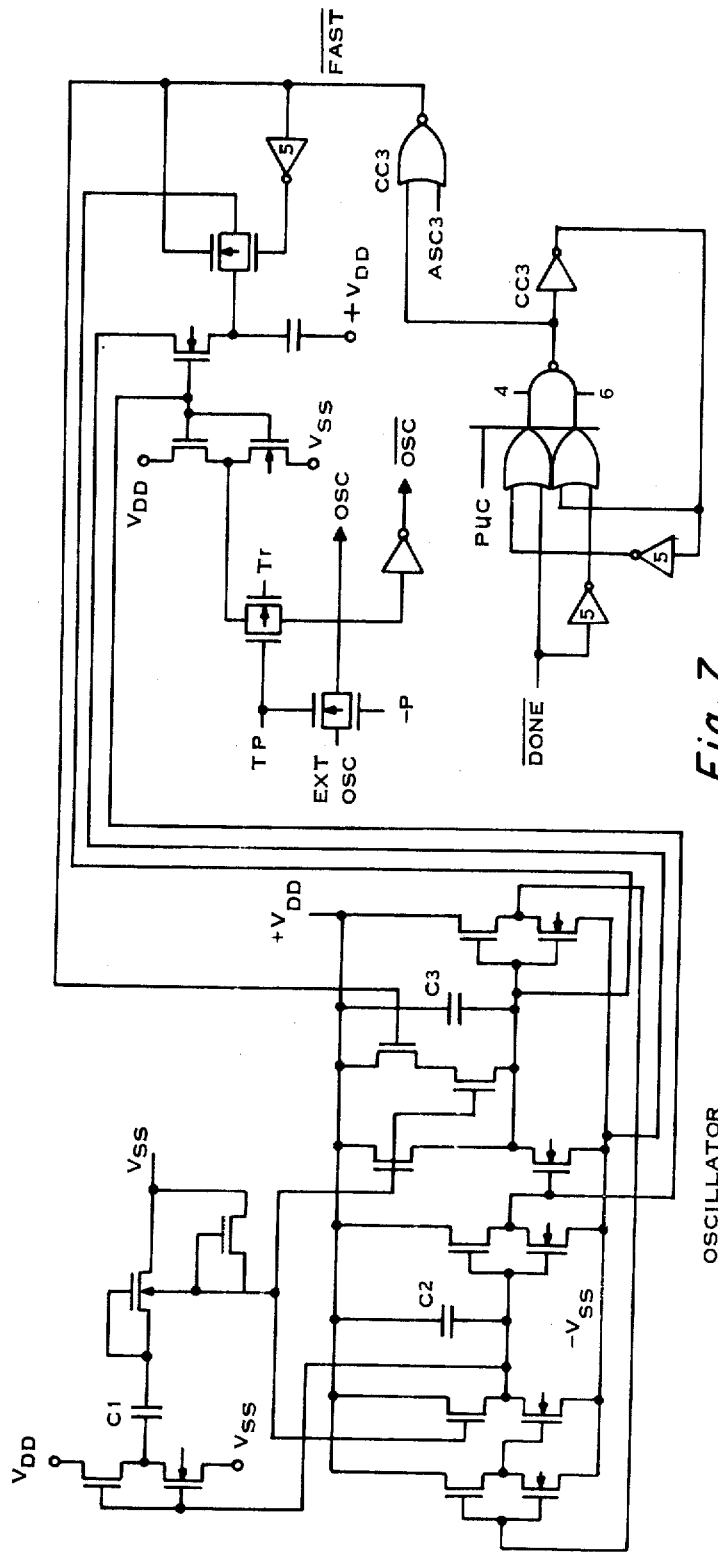
FIG. 7 is a detailed schematic diagram of one embodiment of the oscilator 200 of FIG. 6.

Referring to FIG. 7, a preferred embodiment of the oscilator 200 of FIG. 6 is shown in detailed schematic form.

Figure 8:
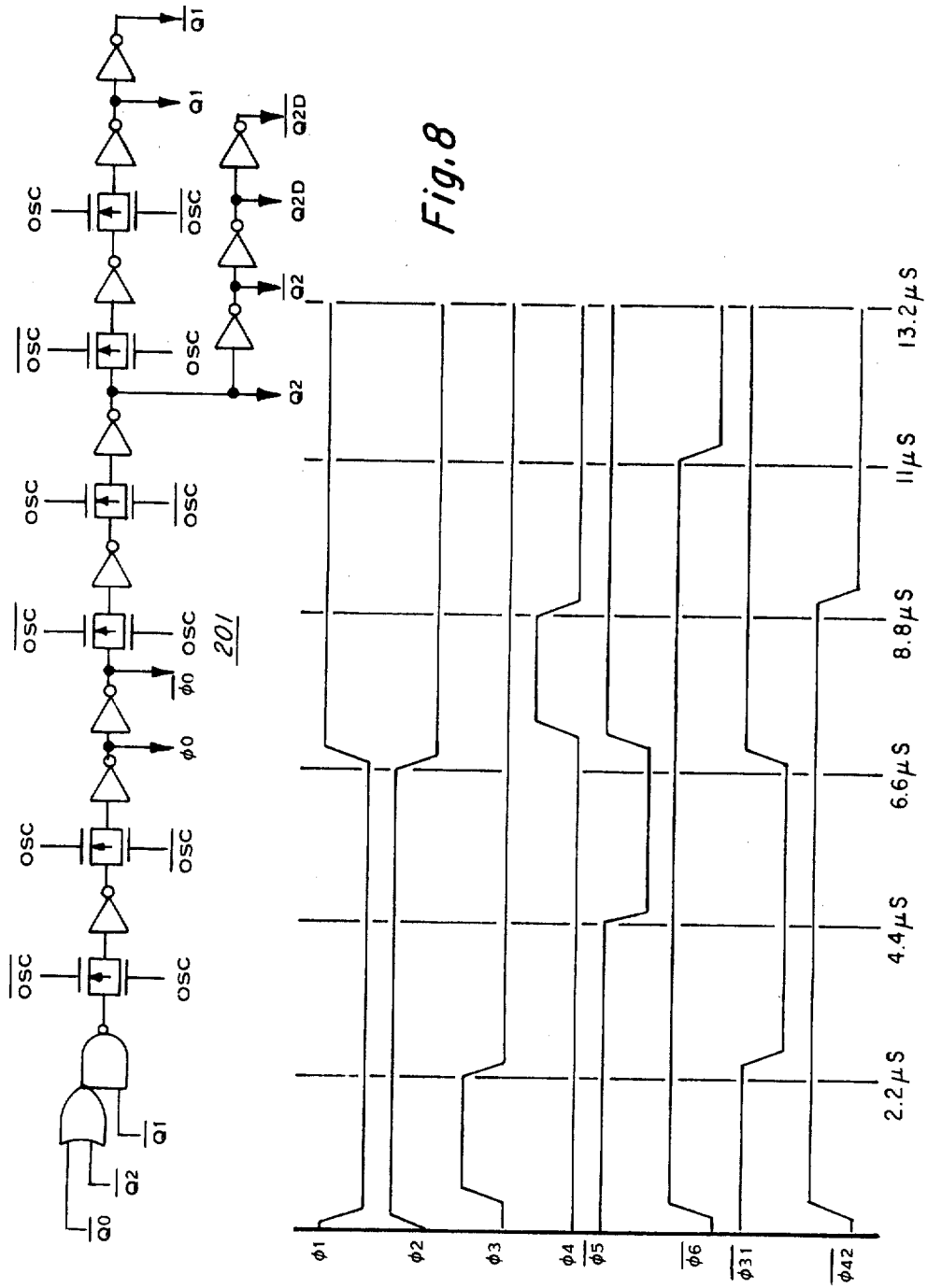
FIG. 8 is a detailed schematic diagram of the clock generator 201 of FIG. 6.

Referring to FIG. 8, the clock generator of FIG. 6 is shown in detailed schematic form, along with the associated clock generator waveforms plotted as voltages against time.

Figure 9:
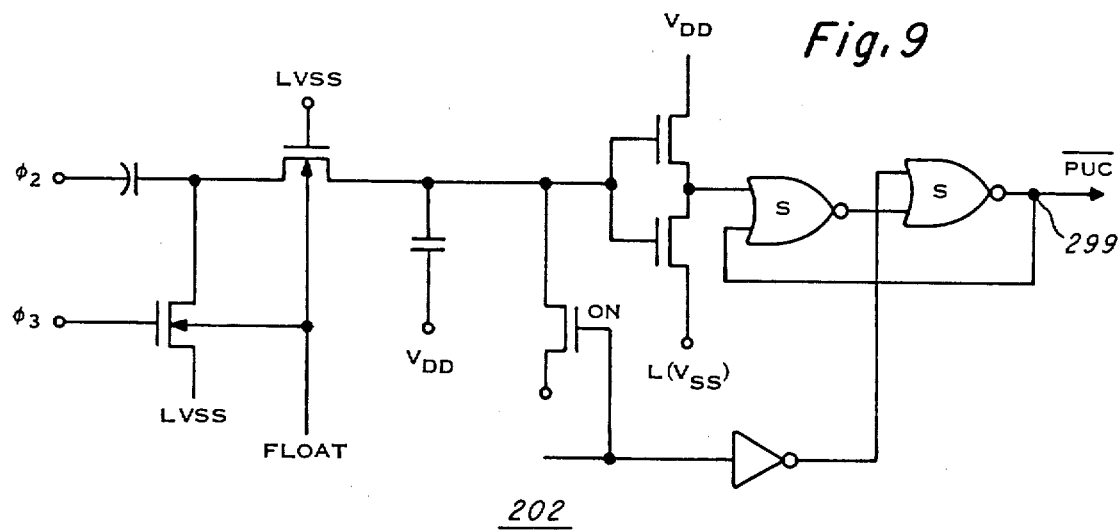
FIG. 9 is a detailed schematic diagram of the power up clear logic 202 of FIG. 6.

Referring to FIG. 9, a preferred embodiment of the power-up-clear signal means 202 is shown in detailed schematic form. The power-up-clear signal 299 which is connected to the constant memory logic means 106 assures consistant power-up-clear signals by connection of critical nodes to the live main power supply LVSS, as shown in FIG. 9.

Figure 10:
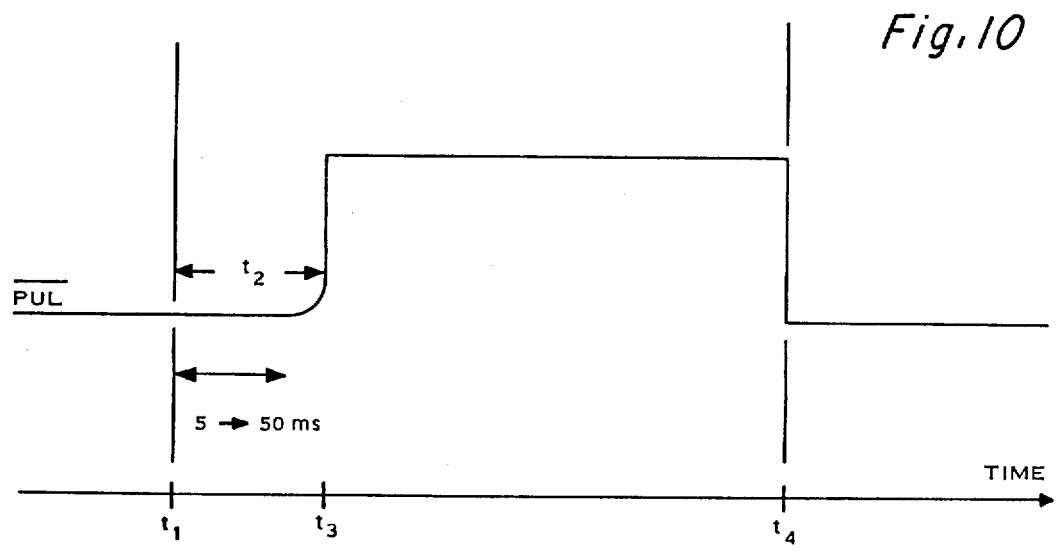
FIG. 10 is a graphical representation of the voltage appearing at node 299 of FIG. 9, plotted as a function of time for both the calculator on-state and off state.

Referring to FIG. 10, the voltage waveforms at node 299 of FIG. 9 are shown plotted as a function of time. At time t3, the calculator is initialized, and the calculator is deemed to enter the on-state. Prior to time t1, the calculator was in an off-state, and the power-up-clear signal was at a buffer inhibit signal level, which is the main supply voltage in the preferred embodiment. During the power-up stabilizing time interval t2 commencing at time t1, the power-up-clear signal stays at the inhibiting signal level as in the calculator off-state. In the preferred embodiment, this time interval may be 5-50 miliseconds. At time t3, the stabilizing interval t2 is terminated, and the power-up-clear signal is brought to a buffer enable signal level, which is the system ground in the preferred embodiment. The power-up-clear signal is maintained at the buffer enable signal level during the remainder of the calculator on-state. At time t4, the calculator is turned off, and the calculator is deemed to be in an off-state. The power-up-clear signal is immediately responsive to the calculator off-state, returning to the buffer isolation signal level. In contrast, in a nonconstant memory calculator design, the power-up-clear signal did not perform this multiplicity of functions.

Referring again to FIG. 4, the live system 100 is connected to an external RAM 180. Critical control signals for the external RAM 180 may be provided by connection to the digit latches 101 of the live systems 100, as the digit latches form a part of the constant memory system, and are therefore active and valid even in the calculator off-state. The digit latches 101 are addressed exclusively by the word decode output from buffer 104. Thus, only one of the many different digit latches is addressed at a time, a preferred embodiment comprising 16 digit latches. A digit latch is written into by using a "set R-line" or a "reset R-line" instruction. Thus, the same word line decode is used to address the digit latches and the external memory as is used to address the internal RAM. As shown in FIG. 5d, each memory cell 131 of digit latches 101 includes a buffer inverter 132 which is connected from the internal digit latch output to a bonding pad DL0 to DL15 for connection to the external RAM. The inverter 132 is an output buffer which is used for several purposes, for example, to scan the keyboard, to address the segment latches of FIG. 12, and for connection to the external memory 180 of FIG. 4, as well as to provide the address signals for the external RAM 180 of FIG. 4. However, two of the digit latch outputs must be completely independent in function, and not serve as part of the keyboard scan, etc., to provide a chip select output and a write control output for connection to the external RAM. The buffers 132 of the digit latch outputs corresponding the write control and chip select output for connection to the external RAM form an additional element of the memory interface buffer 104 of FIG. 4, and as such must also be connected to the live power supply means 105. Thus, even in the calculator off-state, the write control and chip select digit latch outputs are maintained at the stored signal level so as to deselect the external memory during the calculator off-state. With reference to the digit latches, the terms "digit lines" and "R-lines" may be used interchangeably.

The digit latches 101 are independent of and have no effect on the internal constant memory RAM 102, and DAM 103. The digit latches 101 serve as a separate constant memory for control signal interface to the external RAM.

Figure 11A:
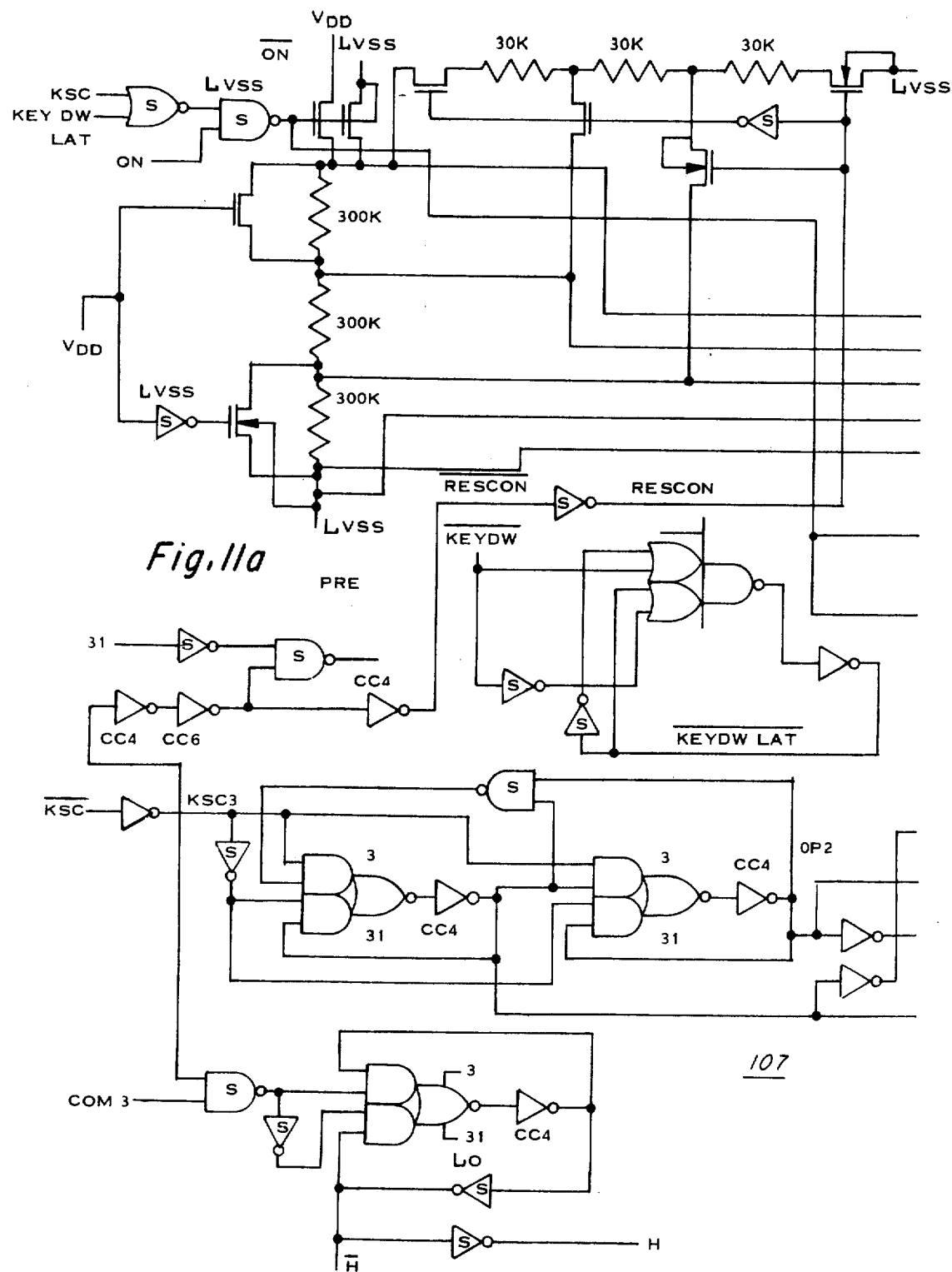
Figure 11B:
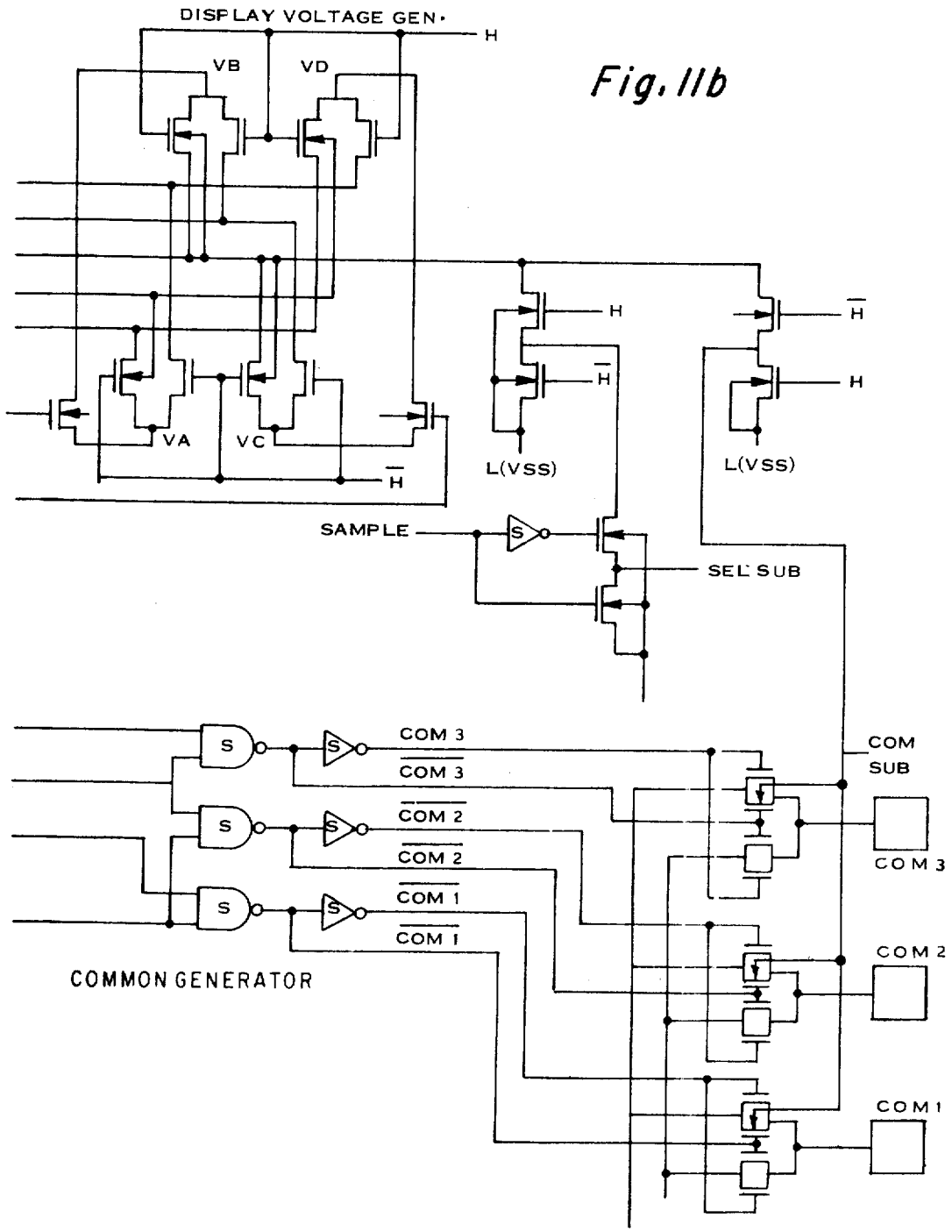
Figure 12A:
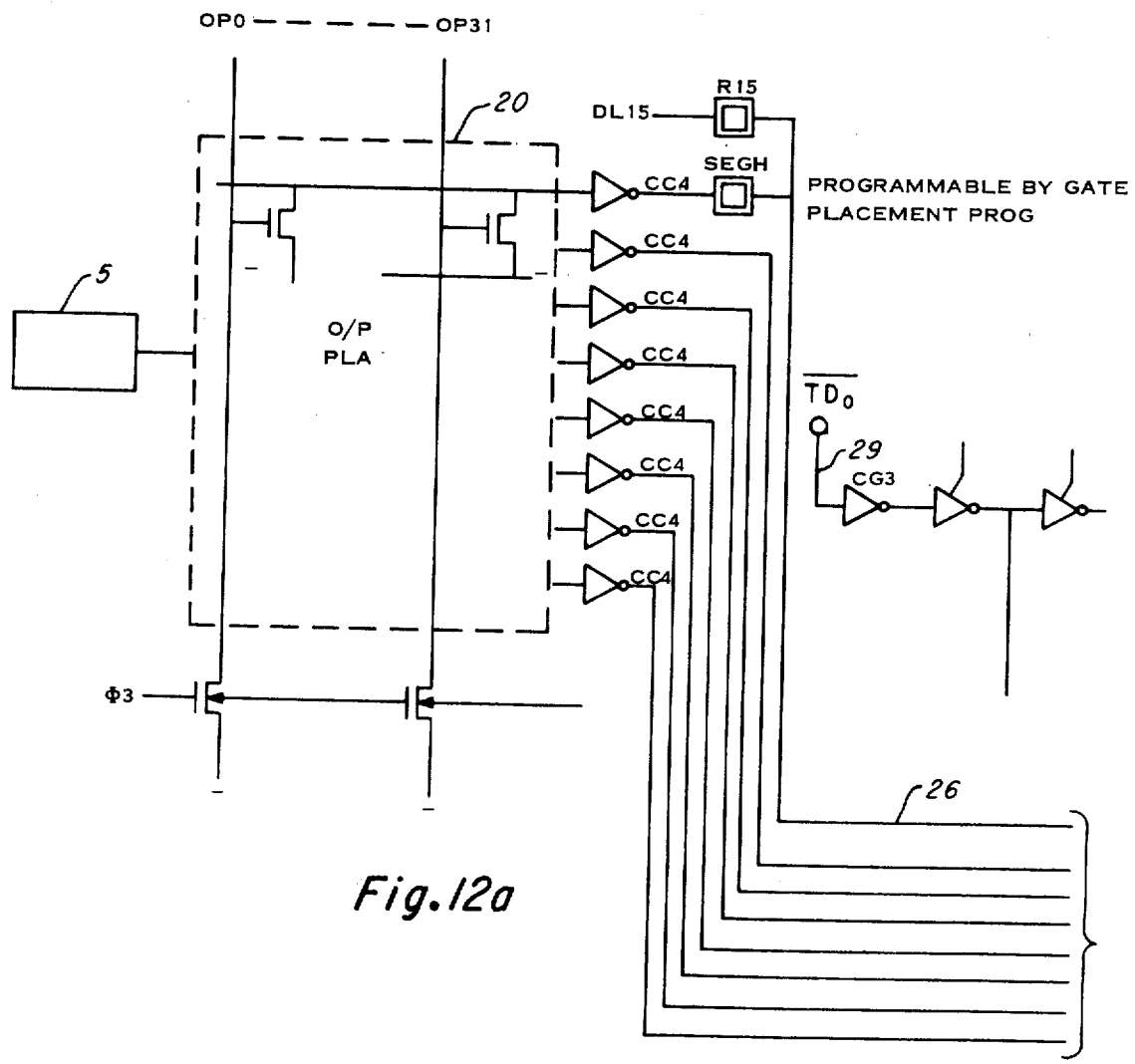
Figure 12B:
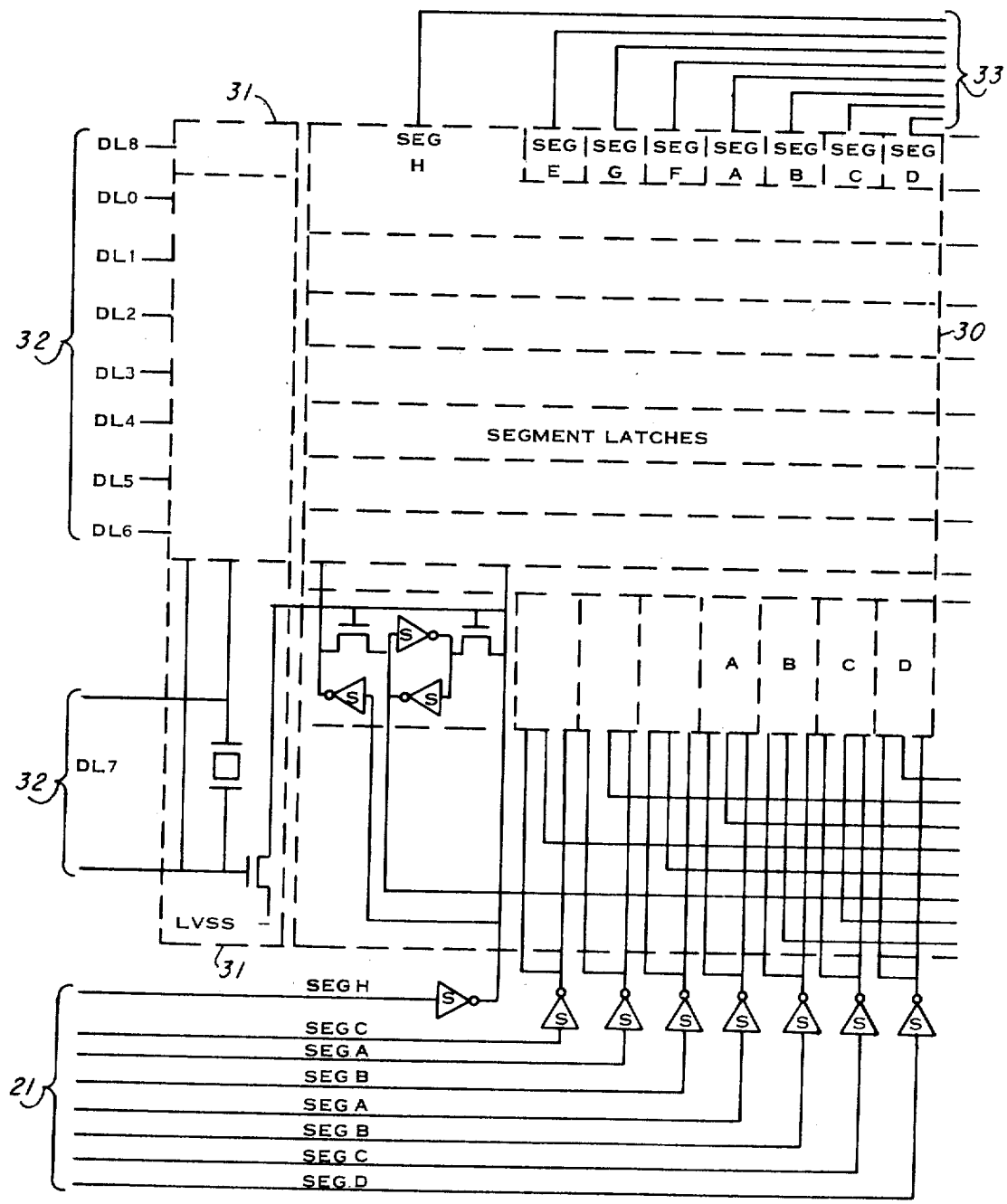
Figure 12C:
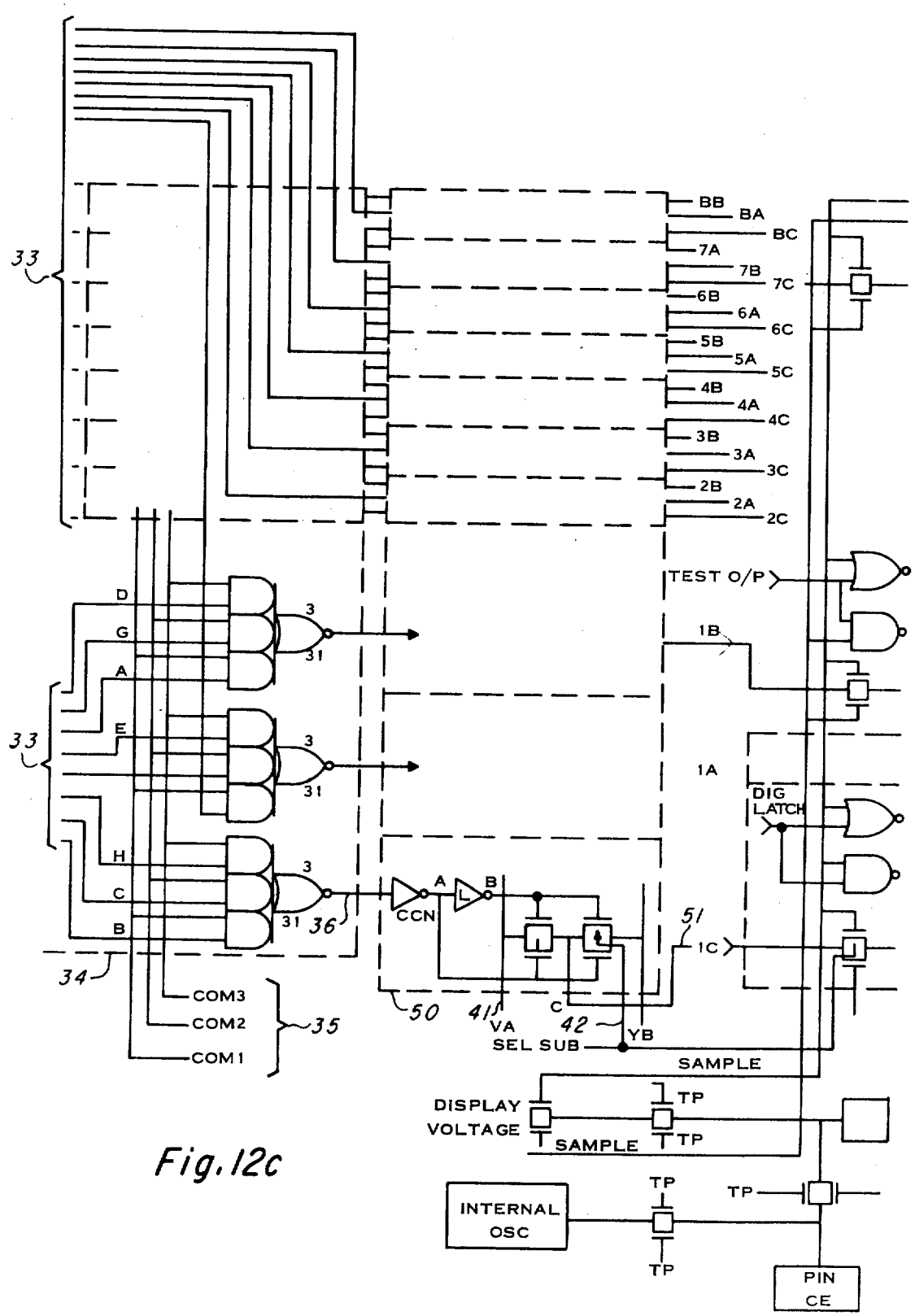

Referring to FIGS. 11-12, the other unswitched logic 107 of FIG. 4 is shown in detailed schematic form, for a partially live, partially switched display interface system as described in copending patent application Ser. No. 46,887, by Leach, et al, for "Static Latches for Storing Display Segment Information".

Although the invention has been described with reference to specific embodiments, this description is not meant to be construed in a limiting sense. Various modifications of the disclosed embodiment, as well as other embodiments of the invention, will become apparent to a person skilled in the art upon reference to the description of the invention. It is therefore contemplated that the appended claims will cover any such modifications or embodiments as fall within the true scope of the invention.

What is claimed is:

1. An electronic data processing system having a fully powered state and a low power standby state comprising:
   a manually operable input means for generating input signals indicative of input data and operational functions, said indicated operational functions including a fully powered state selection signal and a low power standby state selection signal;
   an electric power source;
   a power supply control means connected to said electric power source and responsive to said selection signals, having a first power output and a second power output, said power supply control means for continuously coupling said electric power source to said first power output, for coupling said electric power source to said second power output upon receipt of said fully powered state selection signal and for decoupling said electric power source from said second power output upon receipt of said low power standby state select signal;
   an arithmetic logic means powered via said second power output, responsive to said input signals for performing said indicated operational functions on said input data for generating output data;
   an output means powered via said second power output, responsive to output data generated by said arithmetic logic means, for indicating a certain condition to an operator corresponding to said output data;
   a read/write memory means powered via said first power output for entering, storing and recalling data;
   a memory control means powered via said first power output for selectively coupling said output data to said read-write memory means for entry and storage therein and for selectively coupling recalled data from said read/write memory means to said arithmetic logic means according to said indicated operational functions, said memory control means being responsive to said selection signals and further including means for enabling entry of data into said read/write memory means upon receipt of said fully powered state selection signal and for inhibiting entry of data into said read/write memory means upon receipt of said low power standby state selection signal.

2. An electronic data processing system as claimed in claim 1, further comprising:

a power-up stabilizing means powered via said first power output, connected to said memory control means and responsive to said select signals for causing said memory control means to inhibit entry of data into said memory means for a predetermined period after receipt of said fully powered state select signal.

3. An electronic data processing system having a fully powered state and a low power standby state comprising:

a manually operable input means for generating input signals indicative of input data and operational functions, said input signals including a fully powered state selection signal indicative of a fully powered state and a low power standby state selection signal indicative of a lower power standby state;

an output means for indicating a certain condition to an operator;

an electric power source;

an integrated circuit connected to said manually operable input means, said output means and said electric power source, said integrated circuit comprising a first set of circuits disposed in a first set of diffusion wells including an arithmetic logic means responsive to said input signals for performing said indicated operational functions on said input data for generating output data and an output interface means, responsive to output data generated by said arithmetic logic means, for causing said output means to indicate a condition corresponding to said output data, and a second set of circuits disposed in a second set of diffusion wells including a read/write memory means for entering, storing and recalling data and a memory control means for entry and storage therein and for selectively coupling recalled data from said read/write memory means to said arithmetic logic means according to said indicated operational functions, said integrated circuit further comprising power supply control means, responsive to said fully powered state selection signal and said low power standby state selection signal, for coupling said first set of diffusion wells to said electric power source only during said fully powered state and for coupling said second set of diffusion wells to said electric power source furing both said fully powered state and said low power standby state.

4. An electronic data processing system as claimed in claim 3, wherein said electronic data processing system further comprises:

a further integrated circuit including a further read/write memory means for entering, storing and recalling data;

said first set of circuits disposed in said first set of diffusion wells further comprises a further memory control means for selectively coupling said output data to said further read/write memory means for entry and storage therein and for selectively coupling recalled data from said further read/write memory means to said arithmetic logic means according to said indicated operational functions; and said power supply control means further comprises means, responsive to said fully powered state selection signal and said low power standby state selection signal, for coupling said further read/write memory means to said electric power source during both said fully powered state and said low power standby state.

5. An electronic data processing system as claimed in claim 4, wherein:

said first set of circuits disposed in said first set of diffusion wells further comprises a power-up stabilizing means connected to said memory control means and said further memory control means and responsive to said fully powered state selection signal for causing said memory control means to inhibit entry of data into said read/write memory means and for causing said further memory control means to inhibit entry of data into said further read/write memory means for a predetermined period after generation of said fully powered state selection signal.

* * * * *